AMPHOLYTIC METAL ESTERS AND THE METHOD OF THEIR PREPARATION
Filed Nov. 17, 1959
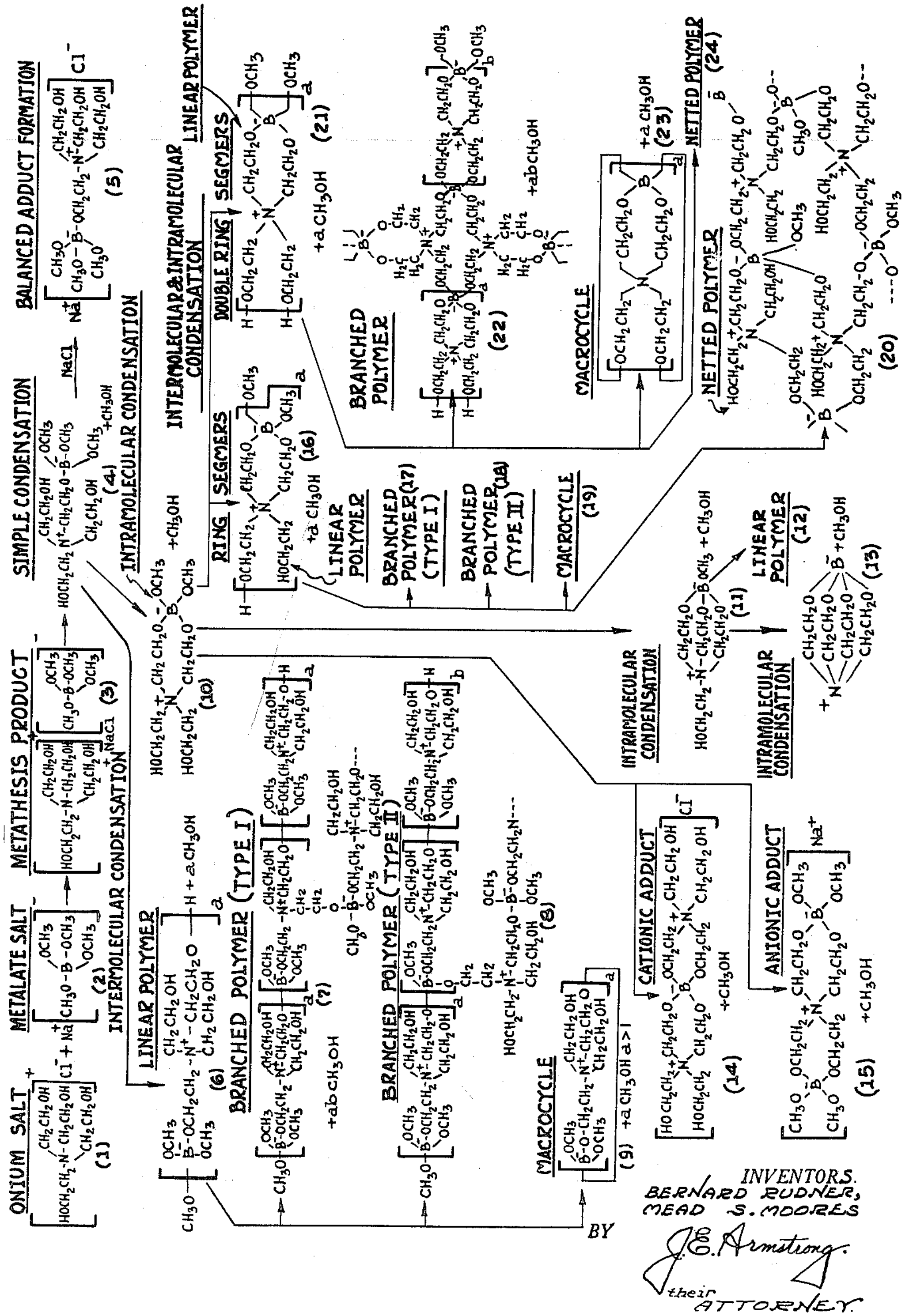
INVENTORS.
BERNARD RUDNER,
MEAD S. MOORES
BY J. E. Armstrong
their ATTORNEY.

United States Patent Office 2,976,307

Patented Mar. 21, 1961

1

2,976,307

AMPHOLYTIC METAL ESTERS AND THE METHOD OF THEIR PREPARATION

Bernard Rudner and Mead S. Moores, Pittsburgh, Pa., assignors to Koppers Company, Inc., a corporation of Delaware Filed Nov. 17, 1959, Ser. No. 853,555

15 Claims. (Cl. 260—448)

This invention relates to novel polymeric and nonpolymeric organic electrolytes. In one specific aspect, it relates to novel intramolecularly and intermolecularly condensed metal ester betaines. In a further aspect, it relates to a novel method by which the betaines of the invention are made.

In recent years, metal and metalloid esters have become increasingly important in industry as lubricants, additives and heat-resistant materials. The known esters of this type have the common disadvantage of being readily susceptible to hydrolysis. Thus, the simple organic borates, useful as fuel additives, would be far more valuable if they were less readily hydrolyzable. The so-called "inorganic polymers" of boron and aluminum, e.g.

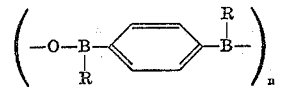

would be in great demand as heat-resistant materials for rockets if they were not subject to almost instantaneous hydrolysis.

Quite surprisingly, we have discovered novel ionizable esters containing either boron or aluminum which, even after 24 hours in aqueous solution, are recoverable as such. This resistance to hydrolytic cleavage is surprising, since the ionizable esters known heretofore, e.g. sodium tetramethoxyborate, are immediately converted by water to inorganic salts and organic alcohols.

The novel metathetical transesterification reaction of the invention provides a method for preparing betaine esters, both unimeric and polymeric, of boron or aluminum. The products of the invention, which are remarkably effective as antistatic agents, are the first known betaine esters in which boron or aluminum is the negatively charged element. The novel polymeric materials possess a further unique characteristic: they are the first known polymeric betaines in which both types of charged atoms are found in the spine of the polymer.

It is, therefore, an object of the present invention to provide a new generic class of both polymeric and nonpolymeric chemical compounds having a common betaine structure and which are useful, inter alia, as antistatic agents. It is a further object to provide a novel metathetical transesterification method of making the new betaines.

In accordance with the invention, we have discovered new and useful betaines corresponding to the generic formula:

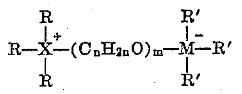

In the above formula and the formulas that appear hereafter (unless special designations are given), Q is a quaternized nitrogen or phosphorus atom and M is a tetracovalent negatively charged boron or aluminum atom, $n$ is an integer having a value of 1–6 and $m$ is an integer having a value of 1–25. The R substituent is an aliphatic radical having from 1–20 carbon atoms, benzyl, aminoalky, alkacylaminoalkyl, $—(C_nH_{2n}O)_mH$, $$—(C_nH_{2n}O)_mMR'_3$$

and $—(C_nH_{2n}O)_mMR'_3]^-Y^+$. R' is hydrogen, lower alkoxy, $—(C_nH_{2n}O)_mQR_3$ or $—(C_nH_{2n}O)_mQR_3]^+X^-$. If R and R' are taken collectively with the Q and M on which they are respective substituents, they form a heterocycle of the group consisting of:

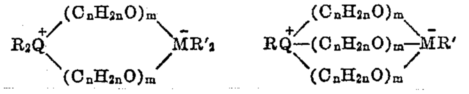

and

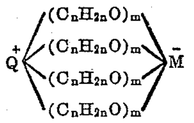

depending on whether one, two or three sets of R+R' react with each other. $Y^+$ represents the cation of the starting metalate and $X^-$ represents the anion of the onium salt used in the preparative reaction.

The nature of the products of the invention can be more clearly understood by referring to the accompanying drawing.

The drawing shows the structures of possible products arising from the reaction of tetrakis-(2-hydroxyethyl)ammonium chloride with sodium tetramethoxyborate. As is seen in the drawing, the initial reaction between the onium salt 1 (or similar salts listed in Table A, infra) and the metalate salt 2 (or similar slats listed in Table B, infra) is a metathesis which yields the simple salt $Y^+X^-$ and the so-called "onium-ate" uncondensed salt 3. The salt 3 is isolable only under special conditions. During ordinary conditions of reaction work-up, most of the uncondensed salt 3 reacts intramolecularly to give as a first product either the simple mono-condensate 4 or its $Y^+$, $X^-$ adduct 5. If Q and M each have only one degree of condensation functionality, as would be the case using a salt such as

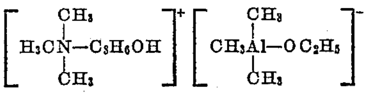

the only products obtainable at reasonable temperatures would be the analogs of 4 and 5. Since, however, the starting metalate salt is always tetrafunctional, further stepwise condensation can occur under reaction conditions of increased severity, as will be explained hereafter.

In the case where Q has at least two transesterifiable groups (in the example of the drawing it has four transesterifiable groups), both intramolecular condensation and intermolecular condensation can occur on the elimination of the next mole of alcohol to give both the unimeric product 10 and the essentially linear polymeric product 6. If the hydroxyl group of hydroxyalkyl radical is more than two carbon atoms away from Q, the linear product 6 will greatly predominate because of steric restrictions on 12 membered ring formation. However, when the hydroxyl groups are only 1 or 2 atoms removed from the Q atom, formation of 6–8 membered rings seems to be preferred over linear configurations.

On further loss of alcohol by condensation, the linear polymer 6 can be converted to a branched polymer 7 wherein the branch chains extend from the nitrogen atom (designated in the drawing as Branched Polymer, Type I), a branched polymer 8 wherein the branch chains extend from the boron atom (designated in the drawing as Branched Polymer, Type II) or a macrocycle 9.

The unimeric product 10 can (in the example shown in the drawing and in the case of other tetrafunctional onium salts) undergo further intramolecular condensation to form unimeric product 11 and unimeric product 13. Unimeric product 11 is capable of intermolecular condensation to form linear polymer 12 (structure not shown in the drawing). Structures 10, 11 and 13 are represented in the general formula by indicating that individual R and R′ substituents are taken collectively with the Q and M on which they are representative substituents to form a balanced ion adducts are likely to be formed. If, in addition, the onium and metalate salts have a different degree of functionality, as in the case of the salt

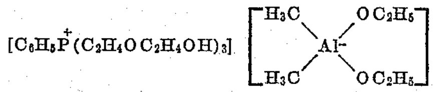

transesterification will lead to products containing appreciable quantities of the unbalanced adducts, e.g.

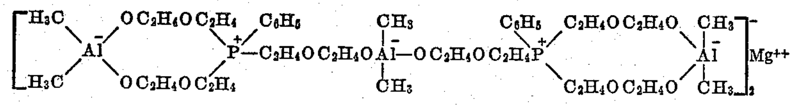

heterocycle corresponding to these structures. The particular structure formed depends upon the degree of transesterification; i.e. the number of sets of R+R′ that react with each other.

We have noted that our novel condensation products are capable of adduct formation as of the type illustrated by compound 5 in the drawing. It is also possible, upon further condensation of the product 10 to form adducts or ionic salts with the ions $X^-$ or $Y^+$. These salts are illustrated by 14 and 15 in the drawing and are set forth in the formula given hereabove by equating the R substituent to $(C_nH_{2n}O)_mMR'_3]^-Y^+$ or the R′ substituent to $(C_nH_{2n}O)_mQR_3]^+X^-$, wherein the cation $Y^+$ or the anion $X^-$ associates itself with the molecule to compensate for the extra negative or positive charge present on the spine of the molecule. When the initial metathesis is run under conditions favoring complete separation of the salt $Y^+X^-$ from the product 3 (or its analogs), there is relatively little tendency to form ion adducts of the types illustrated by 5, 14 or 15. Moreover, under such conditions, any type of "unbalanced charge" adduct, e.g.

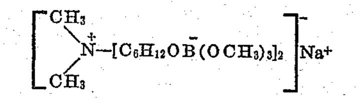

tends as much as possible, to find a complementary organic molecule with which to react, as is shown in the following equation:

The unimeric product 10 is capable of intermolecular condensation to form polymers having single ring segmers, such as linear polymer 16, branched polymer 17, branched polymer 18 and macrocycle 19. The structure of polymers 17, 18 and 19 is not shown in the drawing. The formation of a netted polymer 20 can also occur. Intermolecular condensation of unimeric product 10 also results in the formation of polymers containing double ring segmers such as linear polymer 21, branched polymer 22, macrocycle 23 and netted polymer 24 (structure not shown in the drawing).

The degree of intermolecular condensation and the degree of intramolecular condensation, which determines the structure of the product obtained, depends to a large extent upon the reaction conditions selected, as will be explained in detail hereafter. Thus, under certain conditions many of our novel products are readily interconvertible. For example, cationic adduct 14 can react with anionic adduct 15 to produce a linear polymer such as 21. Linear polymer 6 can be converted to linear polymer 16 or to linear polymer 12 by further condensation. By removing alcohol from balanced adduct 5 it is possible to make cationic adduct 14 and anionic adduct 15. Most of our products occur as mixtures and because of their compatability they are useful as such.

The compounds of the invention are prepared by re-

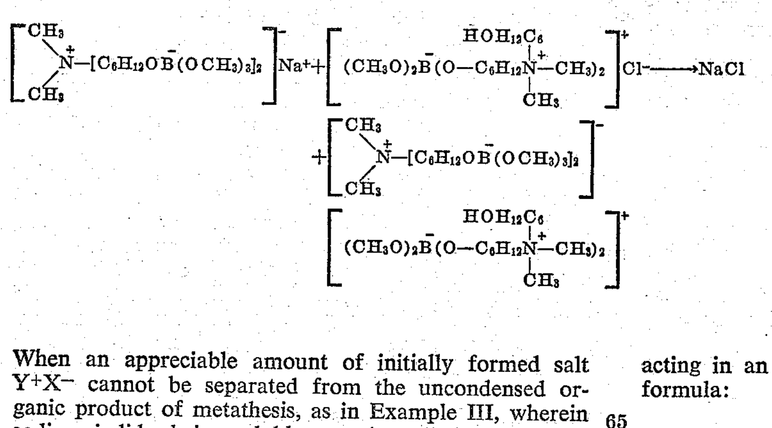

When an appreciable amount of initially formed salt $Y^+X^-$ cannot be separated from the uncondensed organic product of metathesis, as in Example III, wherein sodium iodide, being soluble, remains, all three types of organic ion adducts are formed. The balanced ion adducts, e.g. 5, are the most stable type and are altered only by sublimation or chemical reaction.

To some extent, the formation of both balanced and unbalanced ion adducts is dependent on the nature of the starting onium and metalate salts. If $X^-$ and $Y^+$ are so chosen that they represent the anion of an acid weaker than $H^+MR'_4{}^-$ or the cation of a base weaker than $[R_3Q(C_nH_2O)_mH]^+OH^-$, then both balanced and un-acting in an inert organic liquid an onium salt of the formula:

$$\left[\begin{array}{c} R \\ | \\ R-Q-(C_nH_{2n}O)_mH \\ | \\ R \end{array}\right]^+ X^-$$

with a metalate salt of the formula:

$$Y^+\left[\begin{array}{c} R' \\ | \\ R'-M-R' \\ | \\ R' \end{array}\right]^-$$

In the formulas Q, M, $m$ and $n$ have the values given in describing the compounds of the invention. R is an aliphatic radical having from 1–20 carbon atoms inclusive, benzyl, aminoalkyl, alkanoylaminoalkyl and $$—(C_nH_{2n}O)_mH$$

R′ is a hydrogen or lower alkoxy. The starting materials for our novel products, the onium salts and the metalate salts, are either commercially available or readily prepared from available chemicals. Many useful onium salts can be easily obtained by quaternization of available amines or phosphines. The limits designated hereabove in defining the organic portion of the onium salts are imposed by steric factors or basicity. Thus, triphenylamine is too sterically hindered or, in a more classical sense, insufficiently basic to be quaternized by a halohydrin. The corresponding phosphine, triphenylphosphine, can be readily quaternized, but the product does not undergo our novel metathetical transesterification reaction. Many of the metalate salts can be conveniently prepared by reactions such as those described by H. C. Brown and E. J. Meade, J. Am. Chem. Soc., 78, 3614 (1956).

Typical useful onium salts are listed hereunder in Table A by name and structure and useful metalate salts are given in Table B. The salts of Table A react with those of Table B in the manner shown in the drawing and described in detail in the examples that follow.

TABLE A

*Suitable onium compounds*

| Name | Structure |
|---|---|
| 1. Trimethyl-2-hydroxyethylammonium chloride. | 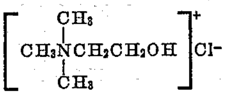 |
| 2. Diallyl-bis-(2-hydroxypropyl) ammonium bisulfate. | $[(CH_2{:}CHCH_2)_2N(CH_2CHOHCH_3)_2]^+HSO_4^-$ |
| 3. Benzyl-tris-(5-hydroxyamyl) ammonium fluoride. | $[C_6H_5CH_2N(CH_2CH_2CH_2CH_2CH_2OH)_3]^+F^-$ |
| 4. Tetrakis-(2-hydroxypropyl)phosphonium chloride. | $[P(CH_2CHOHCH_3)_4]^+Cl^-$ |
| 5. Tris-(benzyldimethylhydroxymethylphosphonium)phosphate. | 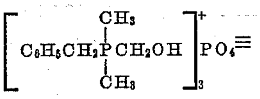 |
| 6. Tetrakis-(2-hydroxyethyl)ammonium perchlorate. | $[N(CH_2CH_2OH)_4]^+[ClO_4]^-$ |
| 7. Cetyltris-(2-hydroxybutyl)phosphonium bromide. | $[n\text{-}C_{16}H_{33}P(CH_2CHOHCH_2CH_3)_3]^+Br^-$ |
| 8. Methyl-3-(oleoyloxy)propyl-bis-(3-hydroxypropyl)ammonium trichloroacetate. | 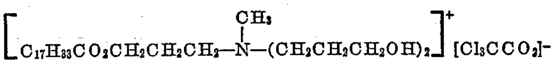 |
| 9. Tetrakis-(2-hydroxyethyl)dimethylethylene-diammonium sulfate. | 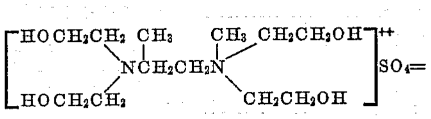 |
| 10. Ethylene-bis(diethyl)-2-hydroxypropyl)ammonium iodide. | 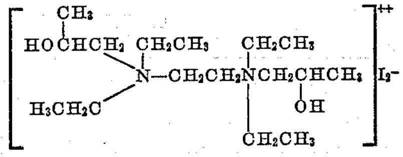 |
| 11. N,N-bis-(4-hydroxybutyl)pyrrolidinium chloride. | 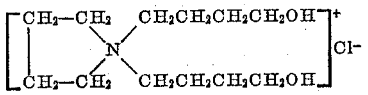 |
| 12. 3-(octadecenylamino)propyltris-(2-hydroxyethyl)ammonium tosylate. | 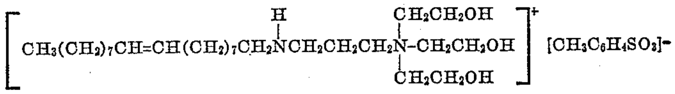 |
| 13. N,N′-Bis-(2-hydroxypropyl)piperazinium sulfate. | 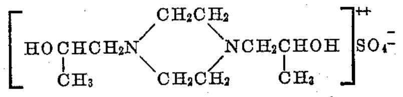 |
| 14. Phenylbenzylbis-(β-hydroxyethylethoxyethoxy)phosphonium bromide. | 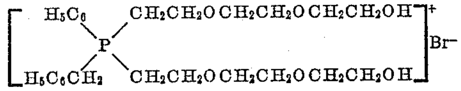 |
| 15. Di-(2-Ethylhexyl)-bis(β-hydroxypentaethoxyethyl)ammonium methosulfate. | 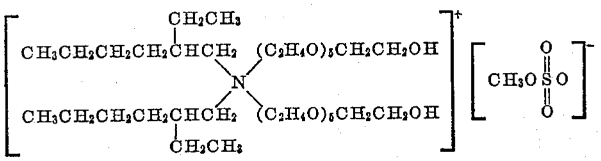 |
| 16. Di-n-Butyl-(2-hydroxyethyl)-(2-hydroxypropyl)phosphonium bromide. | 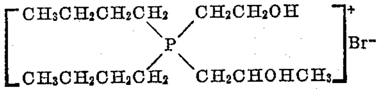 |

TABLE B

*Suitable metalate compounds*

| Name | Structure |
| --- | --- |
| 1. Lithium Neopentoxytrihydroborate | 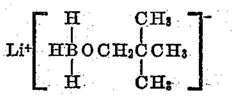 |
| 2. Lithium Amyltriethoxyaluminate | 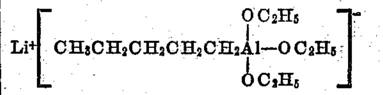 |
| 3. Magnesium Triisopropoxyhydroborate | 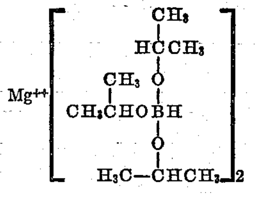 |
| 4. Aluminum Borohydride | 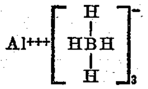 |
| 5. Potassium Tetramethoxyaluminate | 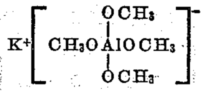 |
| 6. Sodium Tri-t-butoxyhydroaluminate | 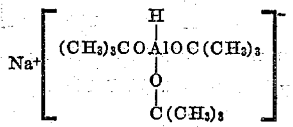 |
| 7. Calcium Triphenylmethoxyborate | 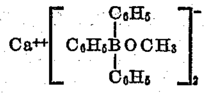 |
| 8. Potassium Dimethoxyethylenedioxyborate | 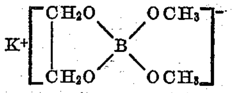 |
| 9. Sodium Triphenoxyhydroaluminate | $Na^+[(C_6H_5O)_3AlH]^-$ |

Since the betaines of the invention are formed as a result of the novel transesterification between the onium cation and the metalate anion, the nature of the anion $X^-$ which is associated with the onium salt and the cation $Y^+$ which is associated with the metalate salt is unimportant. The preferred choice of reactants and, thus, the respective values of $X^-$ and $Y^+$, are governed to some extent by the commercial availability of the starting onium and metalate salts. Ease of handling and ease of product work-up also influence the choice.

The onium halide salts are the most readily available, although, as seen in Table A and in the examples, the method of the invention works equally well when the anion $X^-$ is other than halide. Specific, but non-limiting, organic and inorganic examples of the anion $X^-$ are as follows: acetate, phosphate, diethylphosphate, benzylphosphonate, diphenylphosphinate, monocetyl sulfate, methylsulfonate, hexafluorophosphate, bisulfate, thiosulfate, tetrafluorosilicate, tetrafluoroborate, sulfate, nitrate, and the like.

Where products free of ion adducts are desired, we have found it desirable to choose $X^-$ and $Y^+$ so that they are capable of forming, during the metathetical reaction, simple organic solvent-insoluble electrolytes $Y^+X^-$. In this case, the resulting salt $Y^+X^-$ is theoretically derived from the strong acid $H^+X^-$ and the strong base $Y^+OH^-$, both of which are approximately equal in ionic strength and preferably stronger than the corresponding acids and bases, $H^+MR'_4{}^-$ and $[R_3Q(C_nH_{2n}O)_mH]^+OH^-$, respectively. We, therefore, prefer $X^-$ to be the anion of a strong acid, for example, halide, nitrate, phosphate, trifluoroacetate, and the like. In this case it is also preferred, but not necessary, to choose $Y^+$ from the metals of groups 1A and 2A of the periodic table; i.e. the alkali or alkaline earth metals such as sodium, potassium, lithium, calcium, barium, strontium, magnesium, and the like. Metal salts in which $Y^+$ is a metal other than those of groups 1A and 2A can be readily prepared by anhydrous metathesis, e.g.

$$SnF_2+2LiB(OC_2H_5)_4\rightarrow 2LiF+Sn[B(OC_2H_5)_4]_2$$

Other useful examples of the cation $Y^+$ are zinc, lead, germanium, zirconium, mercury, gallium, cadmium, and the like.

In preparing the compounds of the invention, it is generally suitable to contact the onium salt with a metalate salt in an inert organic liquid, allow the reaction to proceed to completion, and then recover the resultant product, products or product mixtures by standard laboratory techniques.

The liquid organic medium used for the reaction must be an anhydrous inert organic liquid such as hydrocarbons, e.g. tetralin, benzene, cyclohexane, xylene, decane, and the like; halohydrocarbons, e.g. chloroform, bromobenzene, and the like; ethers, e.g. dimethyl ether, tetrahydrofuran, dioxane, diethyleneglycoldimethyl ether, and the like; and polar nitrogeneous liquids, e.g. pyridine, acetonitrile and dimethylformamide. Anhydrous conditions must be maintained during metathesis and transesterification.

The preferred liquid medium for the invention is the alcohol R′OH wherein R′ is the alkyl portion of the lower alkoxy group which goes to form the alcohol eliminated during the transesterification. For example, if the metalate anion is a tetramethoxyborate, methyl alcohol will be eliminated during transesterification and the preferred liquid medium is methyl alcohol. The use of alcohols other than that eliminated during the particular metathetical transesterification reaction being conducted is not recommended, since such alcohols are not inert to the reactants and products, an equilibrium mixture results from transesterification with the solvent.

The order of addition of the reactants is not critical. However, as a matter of convenience, it is sometimes preferred to add a solution of the onium salt in the inert organic liquid to a similar solution of the metalate salt.

The reaction temperature can range conveniently from the temperature of liquid nitrogen (—195° C.) to the reflux temperature of the particular solvent used. Thus, as a practical matter, the temperature used can be varied between —195° C. and about 250° C. The temperature chosen for any given reaction is determined to a large extent by the nature of the desired product. Thus, if it is desired to obtain a pure uncondensed onium-ate salt where no other R is an alkanol residue and only one R′ is alkoxy, slurries of each of the reactants in, e.g. dioxane, can be mixed at room temperature and the reaction will proceed as follows:

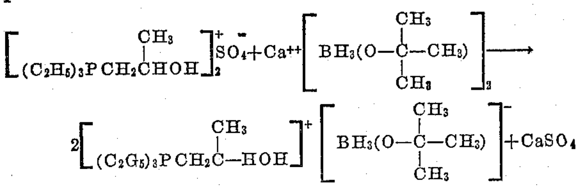

If a simple condensation is desired, the reaction mixture can be carefully maintained at a temperature of e.g. 0°–50° C. to cause transesterification and elimination of one mole of alcohol.

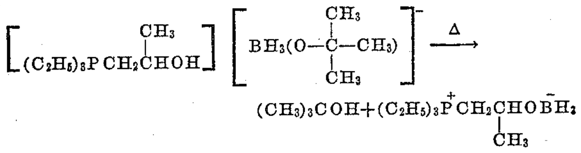

Prolonged heating causes the formation of a fully condensed salt, e.g.

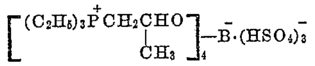

The procedure described hereabove will not give a pure product readily; nor is it generally necessary, for purposes of the invention, to obtain a pure product. Since uncondensed salts are more stable when at least one R′ is hydrogen and when the alkylene radical R is branched at the oxygen-bearing carbon, it follows that the preparation of salts such as $[P(CH_2CH_2OH)_4]^+[B(OCH_3)_4]^-$ and its simple transesterification product, $$(HOC_2H_4)_3\overset{+}{P}C_2H_4O\overset{-}{B}(OCH_3)_3$$

require less mixing and lower temperatures than do the corresponding products mentioned above. Obviously, the extent of temperature elevation and the extent of duration of heating are related. We prefer to maintain our reactants at the lowest temperature at which reaction proceeds satisfactorily until weight loss indicates that the desired number of moles of alcohol have been eliminated. Generally speaking, to obtain the maximum degree of condensation it is best to heat the reaction mixture (after filtration to remove the inorganic salt) to a constant weigh at a temperature of about 125–250° C.

The reaction works well at atmospheric pressure, although sub-atmospheric or super-atmospheric pressures can be used. It is often convenient to work under vacuum, since this promotes removal of the alcohol which is, in most cases, the second product of our novel transesterification. Alternately, the alcohol formed may be removed, if desired, by passing a stream of an inert gas, e.g. dry nitrogen, through the reaction mixture. (If all of the R′ substituents are hydrogen, hydrogen rather than an alcohol will be split off during transesterification.) The extent of pressure reduction depends on the nature of both the starting materials and the desired product. Thus, when the product wanted is a lower condensate of an onium-ate salt in which the two starting compounds have the same degree of functionality (i.e. products of types 10 and 11 of the drawing), the use of a slight vacuum, e.g. 200 mm. of Hg, is advantageous. If, however, it is desired to convert the simple condensate 3 into a high polymer, the use of a relatively high vacuum, e.g. 1–15 mm. of Hg, is desirable. An equally high vacuum is useful when working with the less stable unbalanced cationic and anionic adducts.

The mole ratio of the reactants is not critical, but it does influence to some extent the nature of the products that can be obtained. To obtain products having a maximum degree of purity, it is desirable to use substantially stoichiomertic quantities, based upon the degree of conversion desired. Thus, to convert $[(CH_3)_3PCH_2CH_2OH]^+$ to $$[(CH_3)_3\overset{+}{P}CH_2CH_2O\overset{-}{Al}(OC_2H_5)_3]$$

equimolar quantities are preferable. To convert $$[CH_3)_3PCH_2CH_2OH]^+$$

to $$[[(CH_3)_3\overset{+}{P}C_2H_4O]_4\overset{-}{Al}]^{+++}\overset{-}{Cl_3}$$

the stoichiomertic ratio is 4 moles of onium compound to one mole of metalate.

The reaction time required to produce the novel compounds from the appropriate intermediates is dependent upon conditions of temperature, pressure, mole ratio, thoroughness of contact, and intrinsic process variations apparent to those skilled in the art. The metathetical reaction is almost instantaneous if the salt $Y^+X^-$ formed is insoluble in the particular organic medium selected, but in order to obtain maximum yields it is advisable to stir the mix for 2–4 hours at the reaction temperature desired. As we have noted, the time required for condensation is best measured by loss in weight of the reaction mixture.

Our invention is further illustrated by the following examples.

EXAMPLE I

Under anhydrous conditions, 103.9 g. trimethyl borate were added dropwise to a stirred solution consisting of 54 g. dry sodium methoxide in 250 ml. of absolute methanol. Immediate precipitation occurred. The reaction mixture was filtered in the absence of moisture and dried to give 148 g. of sodium tetramethoxyborate (94% yield). The product was a very hygroscopic white solid, melting at 253–258° C. and soluble in water and methanol. The reaction is shown hereunder:

$$(CH_3O)_3B+NaOCH_3 \rightarrow NaB(OCH_3)_4$$

EXAMPLE II

Triethanolamine, 149.2 g. in 200 ml. methanol, was treated at 0° C. with 156.2 g. methyl iodide. The mixture was allowed to stand overnight and then filtered free of 42.2 g. triethanolamine hydriodide (photosensitive crystals). The filtrate was evaporated in vacuo to give 254.4 g. of a red oil which, on trituration with acetone, followed by vacuum drying, gave 237.3 g. of a thick orange oil. The product represented an 81% yield of methyl-tris-(2-hydroxyethyl) ammonium iodide. (Analysis: I, Calculated 43.6%; Found 43.8%.) The quaternization is shown below:

$$CH_3I+N(C_2H_4OH)_3 \rightarrow [CH_3N(C_2H_4OH)_3]^+I^-$$

Running the quaternization in the absence of solvent gave a higher yield of product richer in the amine hydriodide.

EXAMPLE III

A 29.4 g. quantity of the product of Example II in 50 ml. dry methanol was mixed with 15.8 g. of the product of Example I in 50 ml. methanol. The reaction mixture stood overnight at —10° C. and gave a clear, colorless solution. The solution was evaporated in vacuo at room temperature. The distillate was methanol containing only a trace of $(CH_3O)_3B$. The residue, weighing 35.7 g., appeared as a rigid foam crushable to a white powder, melting at 228–30° C. with discoloration, and readily soluble in water (with alkaline reaction). Although the product should have contained one equivalent of sodium iodide, X-ray diffraction showed absence of this as such, as well as the absence of polymers. Fractional precipitation using various solvents failed to remove or concentrate organics or inorganics, and, therefore, the product was believed to be the loose adduct

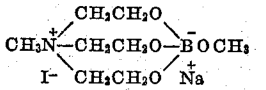

which is relatively unstable to heat. Heating the product at 200–230° C. in vacuo gave as a sublimate a crystalline white solid, melting at 233–6° C. with decomposition and sublimation. The crystals were halide-free, and water and methanol soluble (alkaline reaction). The structure of the product was assumed to be:

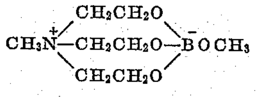

1-methyl-5-methoxy-1-aza-5-bora - 4,6,11 - trioxabicyclo-[3.3.3]undecane betaine. After being held at 230–240° C. in vacuo for one hour a 5.0 g. sample of the colorless adduct was converted to 3.25 g. of involatile glassy polymer soluble only in water (0.67 g. being isolated as the colorless sublimed bicyclic betaine). The following reactions appeared to have taken place:

$$[CH_3N(C_2H_4OH)_3]^+I^- + NaB(OCH_3)_4 \longrightarrow Na[CH_3\overset{+}{N}(C_2H_4O)_3\overset{-}{B}OCH_3]I^-$$

$$Na[CH_3\overset{+}{N}(C_2H_4O)_3\overset{-}{B}OCH_3]I \xrightarrow{heat} CH_3\overset{+}{N}(C_2H_4O)_3\overset{-}{B}OCH_3 + NaI$$

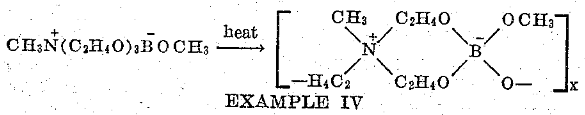

EXAMPLE IV

The product of Example II, 100 g. in a minimum of deionized water, was stirred at reflux for four hours with 59.3 g. freshly prepared silver chloride and thereafter cooled and filtered. The combined filtrate and washings, evaporated dry in vacuo, gave 64.4 g. (93.7%) methyl-tris-(2-hydroxyethyl)-ammonium chloride which appeared as colorless deliquescent crystals, melting at 181–190° C. and containing 18.1% chlorine (theory 17.7%).

$$[CH_3N(C_2H_4OH)_3]^+I^- + AgCl \rightarrow AgI + [CH_3N(C_2H_4OH)_3^+Cl^-$$

EXAMPLE V

Twenty g. of the product of Example IV in 50 ml. methanol were mixed with 15.8 g. of trimethyl borate in 50 ml. of methanol to give an immediate white precipitate. Filtration yielded 5 g. sodium chloride (86% of theory). Evaporation of the combined methanol wash and filtrate at room temperature gave, as a clear, colorless gum, 26.5 g. crude 2-[methyl-bis-(2-hydroxyethyl)-ammonium] ethoxy trimethoxyborate betaine $$(HOC_2H_4)_2\overset{+}{N}—C_2H_4O\overset{-}{B}(OCH_3)_3$$

as established by stoichiometry.

$$[CH_3N(C_2H_4OH)_3]\overset{+}{C}l^- + NaB(OCH_3)_4 \longrightarrow NaCl + CH_3OH + (CH_3O)_3\overset{-}{B}OC_2H_4\overset{+}{N}(CH_3)(C_2H_4OH)_2$$

EXAMPLE VI

A solution of 20.7 g. of the product of Example I in 75 ml. methanol was added dropwise to a stirred solution of 25.0 g. tetrakis(hydroxymethyl)phosphonium chloride in 75 ml. of methanol over a period of 20 minutes at just below reflux temperature. The resulting mixture was quickly cooled and evaporated dry in vacuum at room temperature. The alkalinity of the sodium tetramethoxyborate caused some destruction of the phosphonium salt (see reactions below), leading to the formation of some trimethyl borate and formaldehyde, but the major part of the reaction went as desired. Evaporation left as residue the crude, glassy, water-soluble polymeric phosphonium tetraalkoxyborate

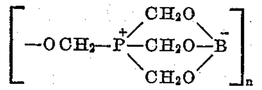

melting at approximately 190° C. with decomposition. On the basis of the analytical data, the stoichiometry of the reactions can be written as:

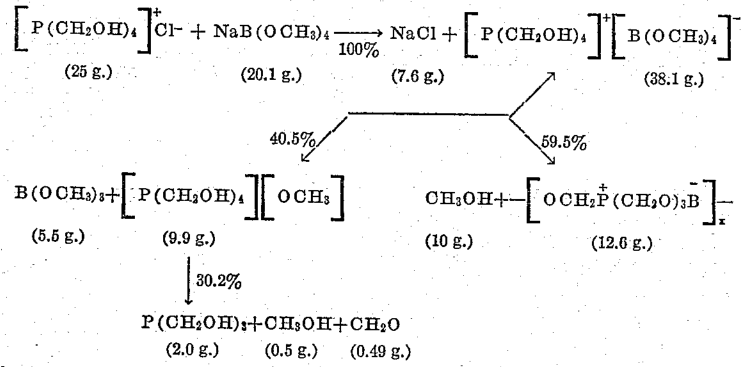

EXAMPLE VII

Under the anhydrous conditions of Example I, 68.1 g. sodium ethoxide and 146 g. triethyl borate in 250 ml. of ethanol gave 197 g. (92%) sodium tetraethoxyborate, melting at 291–293° C. (*d*). The melting point was raised to 348–351° C. by thorough drying.

$$NaOC_2H_5 + (C_2H_5O)_3B \rightarrow NaB(OC_2H_5)_4$$

EXAMPLE VIII

Sodium tetraethoxyborate, 46.5 g. in 350 ml. ethanol, was added all at once, with vigorous agitation, to solution of 41.5 g. tetrakis(hydroxymethyl)phosphonium chloride in 100 ml. of ethanol. The precipitate, after being filtered and dried in vacuo, weighed 51 g. It contained, along with the solid obtained on evaporation of the filtrate, 69% of the theoretical yield of condensed phosphonium tetraalkoxyborate polymer, intrinsically similar to the major product of Example VI. As in Example VI, the remaining portion of the phosphonium salt had been decomposed to alcohol-soluble products.

EXAMPLE IX

Twenty grams of sodium tetramethoxyborate in 200 ml. absolute ethanol was refluxed 45 minutes and then distilled through a 1-plate column at atmospheric pressure until 100 ml. of distillate had been collected. The still pot residue was evaporated dry in vacuo to yield 25.7 g. (95%) sodium tetraethoxyborate, melting at 335–341° C. with decomposition, identical with the product of Example VII.

$$NaB(OCH_3)_4+4C_2H_5OH\rightarrow 4CH_3OH+NaB(OC_2H_5)_4$$

EXAMPLE X

Ethylene bromohydrin, 25 g., and triethanolamine, 29.8 g., were mixed to give a clear solution. After heating this solution on a steam bath for 5 hours, a crystalline slurry was formed. This was triturated cold with 25 ml. methanol, and filtered free of 4.7 g. triethanolamine hydrobromide, melting at 178–184° C. The combined filtrate and wash was diluted with 28 ml. chloroform, cooled, and filtered to yield 37.3 g. (68%) tetrakis(2-hydroxyethyl)ammonium bromide, which appeared as colorless deliquescent crystals melting at 92–96° C. (Br: Found, 28.4%; Calc. 29.1%).

$$N(C_2H_4OH)_3+BrC_2H_4OH\rightarrow [N(C_2H_4OH)_4]^+Br^-$$

EXAMPLE XI

A 9.47 g. quantity of the product of Example I in 25 ml. methanol and 16.5 g. of the product of Example X in 25 ml. methanol were mixed at 20° C. to give a clear solution. Evaporation of this solution to dryness quickly, first at approximately 15° C. and then at room temperature to constant weight, gave 21.8 g. glassy foam, melting with decomposition at 255–275° C. The foam was deliquescent, water soluble (alkaline reaction) and soluble in cold methanol. Since the sodium bromide formed cannot be found by X-ray methods, the product is, as determined by stoichiometry, largely the sodium bromide adduct of 6,6-bis-(2-hydroxyethyl)-2,2-dimethoxy1,3-dioxa-2-bora-6-aza-cyclooctane betaine

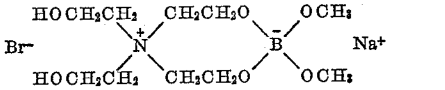

Treatment with a stoichiometric amount of silver nitrate precipitated the requisite amount of silver bromide; as shown below:

$$\overset{+}{Na}[(CH_3O)_2\overset{-}{B}(OC_2H_4)_2\overset{+}{N}(C_2H_4OH)_2]\overset{-}{Br}+AgNO_3\longrightarrow$$
$$AgBr+NaNO_3+(HOC_2H_4)_2\overset{+}{N}-(C_2H_4O)_2\overset{-}{B}(OCH_3)$$

The salt-free organic product decomposed with melting at approximately the same temperature as the adduct.

Since the initial product started to lose volatile liquids at 130° C., it was held in vacuo at 170° C. for approximately 1½ hours, by which time it had lost 99% of the theoretically available methanol:

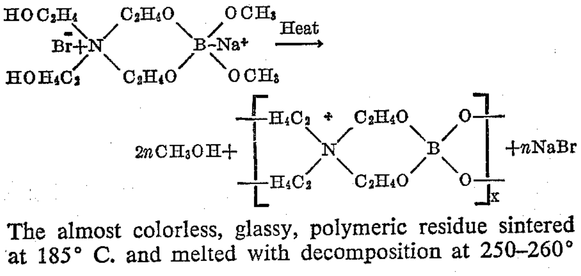

The almost colorless, glassy, polymeric residue sintered at 185° C. and melted with decomposition at 250–260° C. Its properties were similar to those of the first product except that it was insoluble in methanol and gelled very slowly in ethanol. Although the devolatilized product was readily water-soluble, it was not readily hydrolized. From an aqueous solution held at 85° C. for three hours there was recovered the initial weight of product, having an unchanged decomposition point (250–260° C.) but a somewhat greater rate of methanol solubility than did an untreated sample of polymer.

EXAMPLE XII

Sodium tetramethoxyborate, 27.1 g. in 50 ml. methanol, was added to tetraethylammonium bromide, 36.1 g. in 50 ml. methanol. There was no apparent reaction. Evaporation in vacuo gave a total of 60.3 g. solid recovered; 95.5% of the starting weight. An aliquot of this, extracted with hot chloroform, left as residue a nearly quantitative yield of sodium tetramethoxyborate. Chilling the chloroform extract produced an equivalent weight of almost pure tetraethylammonium bromide, melting at approximately 270° C. and containing 37.6% bromide (pure product melts at 276° C. and contains 38.04% bromide). There has, therefore, been no reaction.

EXAMPLE XIII

By the procedure of Example IV, 18.3 g. tetrakis-(2-hydroxyethyl)-ammonium bromide and 14.3 g. silver chloride gave tetrakis-(2-hydroxyethyl)ammonium chloride, 14.2 g. of colorless deliquescent crystals, representing a 93% yield of 98% pure product.

$$\left[N(C_2H_4OH)_4\right]^+Br^-+AgCl\longrightarrow AgBr+\left[N(C_2H_4OH)_4\right]^+Cl^-$$

EXAMPLE XIV

A 10.0 g. quantity of tetrakis-(2-hydroxyethyl)ammonium chloride in 50 ml. absolute ethanol was added to a hot solution of 9.3 g. of sodium tetraethoxyborate. Immediate precipitation occurred. The mixture was allowed to stand at room temperature, and then filtered to give 2.36 g. (93%) NaCl. The filtrate was evaporated in vacuo at 65–70° C. to give 11.4 g. of off-white brittle foam; a quantitative yield of mixed condensates, largely (I)

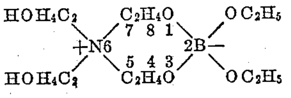

2,2-diethoxy-6,6-bis-(2-hydroxyethyl)-1,3-dioxa-2-bora-6-azacyclooctane betaine, and (II)

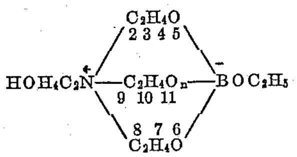

which may be called 1-(2-hydroxyethyl)-5-ethoxy-1-aza-5-bora-4,6,11-trioxabicyclo-[3.3.3.] undecane betaine. Fractionation from acetone-alcohol mixtures served to purify these products. The product mixture melted with decomposition at 230–236° C. (in a sealed capillary tube). However, on being heated to 148° C., and again at 197–201° C., it lost more alcohol. This can be attributed to polymer formation:

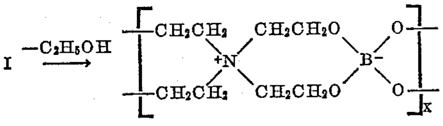

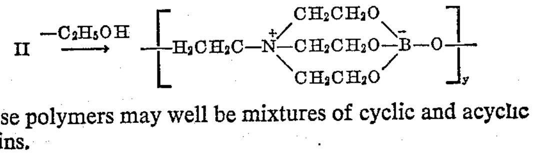

These polymers may well be mixtures of cyclic and acyclic chains.

EXAMPLE XV

A group of commercially available products sold under the trade name "Ethoquad" are reported by their manufacturer to have the general formula

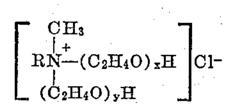

where R is a saturated or unsaturated normal alkyl chain of 8–24 carbon atoms (or a mixture of such chains), and $x$ and $y$ are integers such that their sum can vary from two to fifty or more. These products are made by reacting primary fatty amines with controlled amounts of ethylene oxide, then quaternizing the resultant

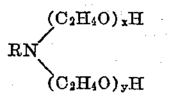

with methyl chloride. The products are therefore complex mixtures in which the number of carbon atoms in R, and the values of $x$ and $y$ and $x$ plus $y$ all vary. Thus "Ethoquad 18/12" is reported by its manufacturer to be

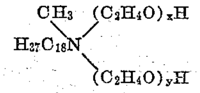

where $x$ plus $y=2$. Including its shipping solvent, the product is reported to have an approximate molecular weight of 422, an amine+amine hydrochloride content of no more than 2%, and a quaternary content of 74–76%. Since the octadecyl residue came initially from the stearoyl or oleyl groups in fats, or the mixed $C_{16}$–$C_{18}$ acid residues in tall oil, it contains limited quantities of $C_{16}H_{33}^-$, $C_{18}H_{35}^-$ and possibly $C_{20}H_{41}^-$ groups. In addition, the value of $x$ plus $y$, given as 2, represents only an average value. Since the addition of ethylene oxide to an amine results in a (roughly) Gaussian distribution, the product will contain individual compounds in which $x$ and $y$ vary from zero to possibly five. In this case, however, where only a very limited quantity of ethylene oxide is used (two moles per mole of amine) it is safe to assume that "Ethoquad 18/12" is indeed principally

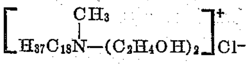

Commercial "Ethoquad 18/12," 272 g. was purified by slurrying in 200 ml. acetone in a Waring Blendor, filtering, washing with 100 ml. $(CH_3)_2CO$, and vacuum drying. The resulting material, 130 g., was primarily octadecylmethyl-bis-(2-hydroxyethyl)ammonium chloride, 96–97% pure by chloride determination, in the form of a free-flowing off-white powder, completely melting at 85° C.

A 93 g. quantity of purified "Ethoquad 18/12" in 100 ml. methanol was mixed with 34.5 g. of the product of Example I in 70 ml. methanol (immediate white precipitate). The reaction mixture was poured into 300 ml. benzene and then filtered to remove 11.0 g. sodium chloride (86.7% of theory). Evaporation in vacuo at approximately 70–80° C. gave 100.1 g. formed product; an off-white powder, very largely

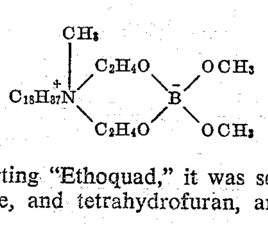

Unlike the starting "Ethoquad," it was soluble in ether, benzene, xylene, and tetrahydrofuran, and insoluble in hot acetone and hot dimethylformamide. A methanol (100 ml.) solution of 45.3 g. product was treated with 7.08 glacial acetic acid to lower the solution pH from 9.43 to 7.0, then evaporated dry in vacuo at 25° C., slurried in acetone and reevaporated to dryness. A more stable product, weight 45.9 g., was formed, which developed less odor and lost less weight in storage in vacuo than did an untreated sample. This can be attributed to the conversion of the methoxide salt impurity to a more stable salt:

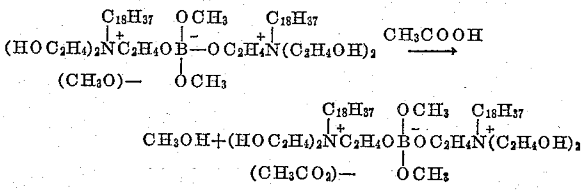

EXAMPLE XVI

When the preceding example was repeated using ethanol as the reaction medium to precipitate out sodium chloride more completely, partial transesterification with the solvent occurred.

A 7.25 g. quantity of sodium tetramethoxyborate in 50 ml. absolute ethanol was mixed with 18.7 g. of 97% pure "Ethoquad 18/12" in 50 ml. alcohol to give an immediate precipitate of 2.23 g. (86% of theory) of sodium chloride. No further precipitation occurred on holding the filtrate at 40° C. It can be seen that use of a solvent in which NaCl was less soluble did not result in more complete precipitation of NaCl. The filtrate was evaporated to constant weight at room temperature in vacuo, giving 25.5 g. of a glassy residue. Since this is approximately 7% greater than the theoretical, and a careful examination failed to disclose the presence of any free solvent or methanol, the solvent must have entered into the reaction, e.g.:

$$NaB(OCH_3)_4+xC_2H_5OH \rightarrow NaB(OCH_3)_{4-x}(OC_2H_5)_x+xCH_3OH$$

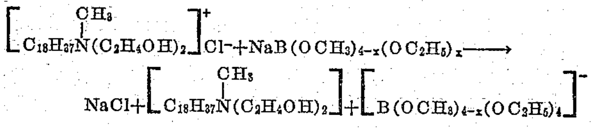

Assuming that no transesterification of "onium" hydroxyl groups with borate alkoxy groups had occurred during evaporation, the gain in weight would represent an average value of $x$ as being somewhat less than one. Since an undetermined amount of condensation had undoubtedly occurred, the true value of $x$ as an average is unknown.

The glassy residue, redissolved in 100 ml. of chloroform, gave no precipitate of sodium chloride on dilution with an equal volume of hexane. From X-ray diffraction studies slightly more than 6 milli-moles of sodium and chlorine, approximately one-eighth of the starting amounts, is tied up in adducts, e.g.

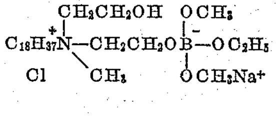

and

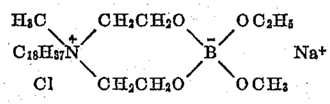

Evaporation of the solution to dryness gave 21.8 g. of off-white foam, which was pulverized to a non-hygroscopic wax that sintered at 102° C. and ran clear at 122° C. By stoichiometry, it was established that the major component probably was the 2,2-dimethoxy-6-methyl-6-octadecyl-1,3-dioxa-2-bora-6-aza-cyclooctane betaine obtained in the preceding example. It was soluble in water, ethanol, chloroform, tetrahydrofuran and benzene, but insoluble in dimethylformamide, ethyl acetate, acetone, and dioxane. Its aqueous solution was alkaline in reaction; acidification with e.g. dilute nitric acid greatly increased its viscosity.

EXAMPLE XVII

Sodium tetramethoxyborate, 73.5 g. in 150 ml. hot methanol, and purified "Ethoquad 18/12," 200 g. in 150 ml. hot methanol, was mixed, held at reflux a few minutes, and then allowed to cool down overnight to give, on filtration, 19.1 g. sodium chloride. The filtrate, on diluting with 1000 ml. benzene and chilling to 0° C., gave an additional 3.8 g. NaCl (total, 22.9 g.=84% of theory). The filtrate was evaporated to dryness; first at atmospheric pressure, then at room temperature to a 20% reduction in volume, and finally at 50–60° C. in vacuo to a constant weight of 218.7 g. This is only very slightly less than the theoretical weight (220.8 g.) obtainable if two moles of methanol were evolved per mole of reactant, e.g.

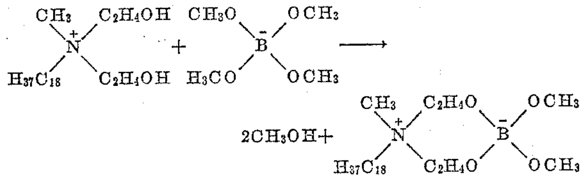

In addition, the analytical data support the above structure (calculated: B, 2.44%; N, 3.2%; Found: B, 2.9%; N, 3.1%). Nevertheless, the dried product was a mixture; recrystallization from acetone gave an appreciable quantity of tan solid that melted with discoloration at about 160° C. and had the correct boron and nitrogen analyses for the structure:

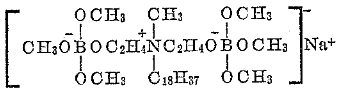

Calculated: B, 3.6%; N, 2.33%. Found: B, 3.4%; N, 2.3%.

The infrared spectra of both recrystallized and unrecrystallized products showed absorption maxima in the 9.2 and 10.3 micron region, which was believed to be characteristic of the

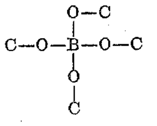

moiety.

EXAMPLE XVIII

A fatty quaternary ammonium chloride available commercially as "Ethoquad 0/25" is claimed by its manufacturer to be a methyloctadecenylpolyethoxy product of the formula

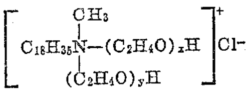

where $x$ plus $y$ averages 15. By this is meant that, for every mole of octadecenylamine, an average of 15 moles of ethylene oxide was consumed in the preparation of the "Ethoquad." This means that even analytically pure "Ethoquad 0/25" is a complex mixture in which $x$ and $y$ can each vary from zero to at least thirty, and therefore the sum $x$ plus $y$ can vary from zero to, say, sixty. However, the statistically averaged product is, according to its manufacture, a 95% pure octadecenyl quaternary salt in which $x$ plus $y$=15, representable for no reason other than convenience as

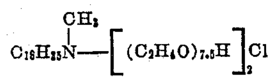

A solution of 15.8 g. sodium tetramethoxyborate in 50 ml. of methanol was added to 100 g. of solvent-free "Ethoquad 0/25" and mixed. The resultant slurry of fine solid in thick liquid was diluted with 100 ml. of dry benzene, and allowed to sit overnight. Sodium chloride (2.81 g.=48% of the theoretical yield) was filtered off, and the filtrate was evaporated (on a steam bath) in vacuo to constant weight. The evaporation residue, 104.4 g. of clear, tan, rigid gel, could not be converted to a solid by further drying in vacuo at room temperature (even over $P_2O_5$) or by chilling. Its final weight checks quite well with that expected on the loss of two moles of methanol per mole of each reactant. On the basis of stoichiometry and analytical data, the product is probably a mixture of almost equal weights of

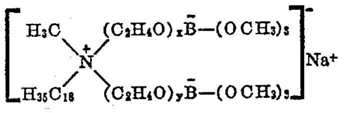

and

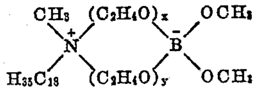

and its NaCl adduct.

EXAMPLE XIX

A product available commercially as "Ethomeen C/12" is described by its manufacturer as being "coco"bis-(2-hydroxyethyl)-amine; $RN(C_2H_4OH)_2$, where R, being derived from coconut fatty acids, consists of the homologous normal alkyl group $C_8H_{17}$—, $C_{10}H_{21}$—, $C_{12}H_{25}$— (major component), $C_{14}H_{29}$—, $C_{16}H_{33}$—, and $C_{18}H_{37}$—, with a small amount of $C_{18}H_{35}$—.

A mixture of 152 g. "Ethomeen C/12" and 76 g. pure benzyl chloride was held at 80–90° C. for five hours and then allowed to stand overnight. It was stripped at 90–100° C. and 2–3 mm. of Hg vacuum for four hours to give 213.5 g. (99% of theoretical) of benzyl-"coco"-bis-(2-hydroxyethyl)ammonium chloride.

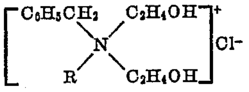

as a clear, viscous orange oil which slowly solidified on standing. Recrystallization from ethyl acetate gave colorless platelets, running clear at about 99° C.

EXAMPLE XX

A solution of 6.4 g. sodium trimethoxyhydroborate, $NaBH(OCH_3)_3$, in 50 ml. methanol was mixed with a solution of 21.5 g. of the product from Example XIX in 50 ml. methanol. A white precipitate was immediately formed, which was removed by filtration. Evaporation of the filtrate to constant weight gave a product which unexpectedly had none of the active hydrogen expected in, e.g.

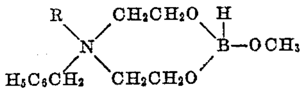

Thus, the reaction of sodium trimethoxyhydroborate with methanol had been completed before its metathesis with the quaternary:

$$NaBH(OCH_3)_3 + CH_3OH \rightarrow H_2 + NaB(OCH_3)_4$$

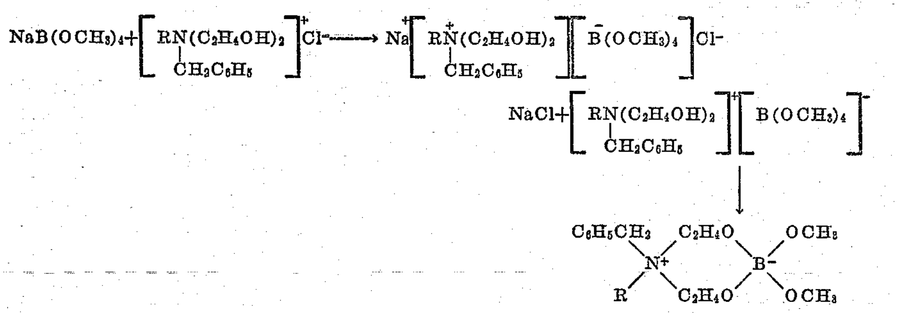

EXAMPLE XXI

Following the general procedure of Example I, sodium metal, 11.5 g. was dissolved in refluxing pure isopropyl alcohol under an atmosphere of dry $N_2$, and then treated dropwise over 45 minutes at reflux (with stirring) with 103.4 g. freshly distilled isopropyl borate. Refluxing and stirring were continued for an additional 90 minutes; the mixture was then cooled and filtered. The white crystals of sodium tetraisopropoxyborate, washed under anhydrous conditions with isopropyl alcohol and a vacuum dried, weighed 118 g. (87.5% of theory) and melted at 287–292° C. with decomposition. The product was insoluble in tetrahydrofuran and 2-propanol, slightly soluble in diglyme, and very soluble in mixtures of diglyme with the other two solvents. On being exposed to air, it was rapidly hydrolized.

$$Na + (CH_3)_2CHOH \rightarrow NaOCH(CH_3)_2$$

$$NaOCH(CH_3)_2 + B[OCH(CH_3)_2]_3 \rightarrow NaB[OCH(CH_3)_2]_4$$

EXAMPLE XXII

To a stirred slurry of 27.0 g. sodium tetraisopropoxyborate in 400 ml. isopropyl alcohol was added in a thin stream a solution of 43 g. of the "coco"benzyl salt of Example XX dissolved in 100 ml. 2-propanol. Stirring was continued in a sealed flask for 2 hours; then the mixture was allowed to stand overnight. Filtration gave 5.3 g. sodium chloride, 91% of the theoretical yield. Vacuum evaporation of the filtrate to constant weight at room temperature gave 45.6 g. of product as light brown foam. It was very hygroscopic, and soluble in water and chloroform. The stoichiometry and the analytical results indicate that the product was largely

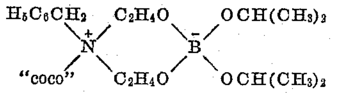

However, the data do not exclude at least two other possibilities, the macrocyclic polymer

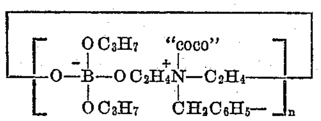

and its borate-terminated derivative

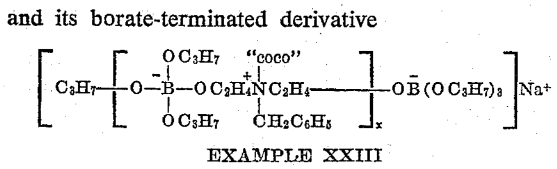

EXAMPLE XXIII

By the general procedure of Example XXI, 11.5 g. sodium, 4.1 g. aluminum isopropoxide, and 800 ml. isopropyl alcohol gave 121 g. (97% of theoretical) sodium tetraisopropoxyaluminate. The product did not melt below 360° C. and was readily soluble in water (with hydrolysis) and methanol, but insoluble in boiling ethanol, ethyl acetate, diglyme and dimethylformamide. Its identity was established by X-ray diffraction, which also showed the presence of a minor quantity of sodium aluminate, $NaAlO_2$.

EXAMPLE XXIV

A 25 g. quantity of the product of Example XXIII and 43 g. of the product of Example XIX, each in 100 ml. isopropyl alcohol, were mixed and stirred in a sealed flask overnight, and then filtered to give 4.7 g. (81.2%) sodium chloride, contaminated with about 23% of its weight of alumina or sodium aluminates. Evaporation of the filtrate to constant weight at room temperature and 2–3 mm. of Hg pressure gave a light yellow, viscous liquid, largely

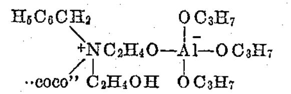

by stoichiometry.

Continued reaction at 2–3 mm. and 90–100° C. gave eventually 43.3 g. of a clear amber, hygroscopic gel, soluble in benzene, acetone and dry alcohols. The stoichiometry and chemistry indicate that the major component of the product is the more or less completely condensed polymer. However, structure determination was made almost impossible due to the great susceptibility of the product to hydrolysis to form β-alumina, $Al_2O_3.3H_2O$.

EXAMPLE XXV

The textile softener commercially available as "Catanac SP" was purified to give dry dimethyl-β-hydroxyethyl-3-(stearoylamino)propylammonium dihydrogen phosphate,

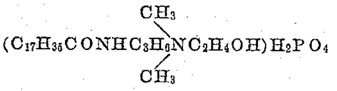

51.1 g. of this material in 50 ml. methanol were mixed with 15.8 g. sodium tetramethoxyborate in 50 ml. methanol to give an immediate gelatinous precipitate. It was stirred well, then allowed to stand overnight. Filtration gave 8.1 g. (67.5% of the theoretical) sodium dihydrogen phosphate. Vacuum evaporation of the filtrate at room temperature to constant weight gave a soft paste, the major component of which was the unesterified salt, dimethyl - β - hydroxyethyl-3-(stearoylamino)propylammonium tetramethoxyborate. Further heating in vacuo at 90–100° C. gave a light yellow wax which had the correct nitrogen content for the monoester:

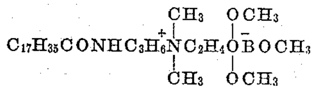

(Calculated: N, 5.42%; Found: N, 5.6%.) It undoubtedly contained compensating quantities of other products.

EXAMPLE XXVI

Twenty-three grams of tetrakis-(2-hydroxyethyl)ammonium chloride in 100 ml. of isopropyl alcohol and twenty-five grams of sodium tetraisopropoxyaluminate in an equal amount of the same solvent were stirred in a sealed flask for 42.5 hours and then filtered. The vacuum-dried residue, weight 29.9 g., was shown by analysis to contain the theoretical yield (5.85 g.) of sodium chloride, a trace of unreacted tetra-isopropoxyaluminate, and a near theoretical yield of the condensates obtained by an average loss of three moles of alcohol. The organic condensate, on the basis of chemical and analytical reactions, appeared to consist very largely of the one compound 1 - (2-hydroxyethyl)-5-isopropoxy-1-aza-5-alumina-4,6,11-trioxabicyclo[3.3.3]undecane betaine.

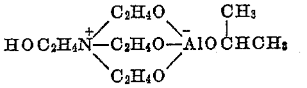

which was separated from the sodium chloride by extraction with isopropyl alcohol. This hygroscopic product melted at 220–225° C. with charring. It was very soluble in water and soluble in methanol, but only 0.2% soluble in cold 2-propanol.

EXAMPLE XXVII

A magnetically stirred flask, equipped with a gas exit tube leading to a gas collector was charged, under anhydrous conditions, with 100 ml. of dry bis-(2-methoxyethyl) ether, 11.5 g. tetrakis-(2-hydroxyethyl)-ammonium chloride, and 6.5 g. sodium trimethoxyhydroborate. The mixture was stirred for 24 hours, during which time 34.6% (388 ml.) of the theoretical amount of hydrogen to be obtained from the reaction $$NaBH(OCH_3)_3 + [N(C_2H_4OH)_4]^+Cl^- \rightarrow NaCl + H_2 + (HOC_2H_4)_3NC_2H_4OB(OCH_3)_3$$

was caught in the gas collector. Filtration and vacuum drying gave 18.3 g., a quantitative yield, of a solvated mixture of sodium chloride, 2-[tris-(2-hydroxyethyl)ammonio]ethoxytrimethoxyborate betaine, and 2-[tris-(2-hydroxyethyl)ammonio]ethoxydimethoxyhydroborate betaine in approximately a 1:2:3 weight ratio. The overall reaction is therefore $$NaBH(OCH_3)_3 + \left[N(C_2H_4OH)_4\right]^+Cl^- \longrightarrow NaCl + H_2 + CH_3OH + (HOCH_2CH_2)_3\overset{+}{N}CH_2CH_2O\overset{-}{B}(OCH_3)_3 + (HOCH_2CH_2)_3\overset{+}{N}CH_2CH_2O\overset{-}{B}H(OCH_3)_2$$

EXAMPLE XXVIII

To demonstrate the hydrolytic stability of the novel products of Example XXVII, 5.0 g. of the mixed condensates was dissolved in 10 ml. of water in a flask to which was connected a gas collector. Very little gas was evolved from this solution at room temperature. Sodium trimethoxyhydroborate, in a similar alkaline solution at room temperature, showed only slightly greater gas evolution. On acidification of the first solution with ten drops of concentrated hydrochloric acid, and allowing the solution to stand at room temperature, there was evolved a total of 15 ml. of hydrogen, 6.1% of the theoretical amount based on the B–H content of our novel product. Under similar circumstances, at least 30% of the sodium trimethoxyhydroborate was converted to methyl alcohol, sodium chloride and diborane (which ignites in water). The acidified first solution, on being held at 60° C. for six hours, evolved only 160 ml. of hydrogen (total), 65% of the theoretical. Sodium trimethoxyhydroborate in acid solution was completely destroyed within fifteen minutes at 60° C.

EXAMPLE XXIX

To demonstrate the thermal stability of our products, even when they contain B–H bonds, 5.0 g. of the product of Example XXVII was heated at carefully controlled temperatures in a small distillation flask. On being carefully heated, virtually no gas was evolved until the product reached its sintering point, 85° C. At that temperature, 90 ml. of gas were evolved (less than 10% of the theoretical), then gas evolution ceased. The flask was slowly heated (½ hour) to 160° C., and held there 3½ hours. During this time, slightly over 100 ml. of gas had been collected, in addition to a distillate weighing approximately 0.9 g. The distillate was shown by mass spectrographic analysis to be composed of 94% methanol, 3.3% ethyldimethoxyborane, 1.2% methyl borate and 1.2% bis-(2-methoxyethyl) ether. The light brown semicrystalline distillation residue weighed 3.95 g., contained appreciable quantities of polymers having the structural units

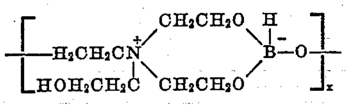

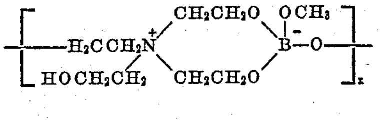

and

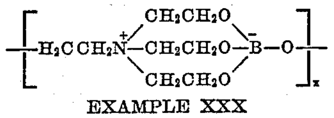

EXAMPLE XXX

A solution of tris-(2-hydroxypropyl)amine, 121.3 g. in 100 ml. of methanol, was treated with 100 g. of methyl iodide, and allowed to stand overnight. It was then refluxed for six hours, and allowed to cool overnight. Vacuum evaporation at 90–100° C. gave 203.4 g. of clear amber oil which, after being extracted three times with ether and vacuum dried, gave 172.8 g. (82% of the theoretical yield) of methyltris-(2-hydroxypropyl)ammonium iodide, 97% pure by iodine determination.

$$CH_3I + N(CH_2CHOHCH_3)_3 \longrightarrow \left[CH_3N(CH_2CHOHCH_3)_3\right]^+ I^-$$

EXAMPLE XXXI

Following the procedure of Example IV, 100 g. of methyltris-(2-hydroxypropyl)ammonium iodide and 51.6 g. of freshly prepared silver chloride gave a quantitative yield of pure methyltris-(2-hydroxypropyl)ammonium chloride:

$$\left[CH_3N-(CH_2CHOHCH_3)_3\right]^+ I^- + AgCl \longrightarrow AgI + \left[CH_3N(CH_2CHOHCH_3)_3\right]^+ Cl^-$$

EXAMPLE XXXII

A solution of 24.2 g. methyltris-(2-hydroxypropyl)ammonium chloride in 100 ml. of 2-propanol was added under anhydrous conditions to a slurry of 27.0 g. of sodium tetra-isopropoxyborate in 100 ml. of the same solvent, and the mixture was stirred in a sealed flask overnight. Filtration through sintered glass, under a rubber dam, gave as residue a quantitative yield (5.8 g.) of sodium chloride. The filtrate, on vacuum evaporation at room temperature, gave 26.7 g. of hygroscopic brittle foam, a mixture of products which had lost on an average of three moles of 2-propanol per mole of product. That it is a mixture of products is clearly shown by the following fractionation experiment:

The product, as a clear, amber solution in 50 ml. of 2-propanol, was diluted with 270 ml. of acetone to precipitate Fraction 32–1. The filtrate from this fraction was treated with 100 ml. more acetone to precipitate Fraction 32–2. Treatment of successive filtrates with 100 ml. portions of acetone gave as solid precipitates Fractions 32–3 and 32–4. The filtrate from Fraction 32–4 required 200 ml. of acetone to precipitate an appreciable quantity of solid (Fraction 32–5). Evaporation of the filtrate from Fraction 32–5 in high vacuum at 90–100° C. gave Fraction 32–6. A summary of the fractionation results is given in Table C.

TABLE C

| Fraction Number | Weight in Grams | Melting Range, ° C. |
|---|---|---|
| 32–1 | 3.53 | 135–150 |
| 2 | 1.45 | 132–142 |
| 3 | 1.86 | 135–142 |
| 4 | 0.70 | 110–125 |
| 5 | 0.86 | 123–132 |
| 6 | 13.90 | 70–75 |
| Total | 22.30 | |

The first fraction appears to be rich in the high-melting, insoluble, 1,3,7,10-tetramethyl-5-isopropoxy-1-aza-5-bora-4,6,11-trioxabicyclo-[3.3.3] undecane betaine,

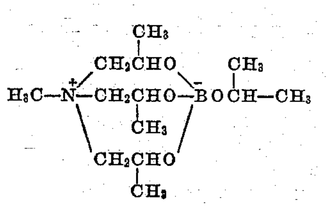

The next two fractions contain appreciable quantities of the less highly condensed 2,2-diisopropoxy-6-(2-hydroxypropyl) - 4,6,8 - trimethyl - 1,3 - dioxa - 2 - bora - 6 - azacyclooctane,

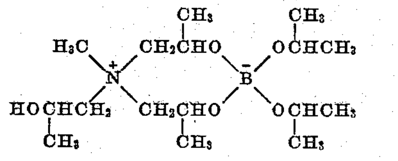

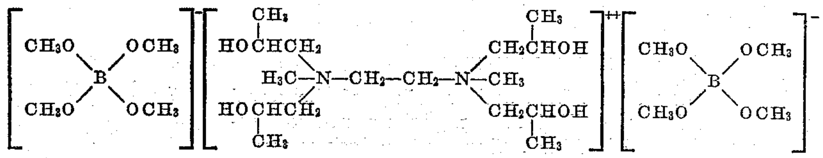

The successive fractions become richer apparently in higher condensates, e.g.

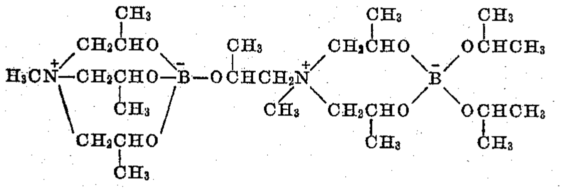

Experiment establishes that Fraction 32–6 is very largely polymeric.

EXAMPLE XXXIII

Following the earlier procedures, 43.3 g. of methyl-tris-(2-hydroxypropyl)ammonium chloride in 100 ml. methanol and 28.3 g. sodium tetramethoxyborate in the same solvent gave, after dilution of the filtrate with 200 ml. of benzene and refiltration, 7.3 g. (approximately 70% of the theoretical yield) of sodium chloride. The residue from vacuum evaporation of the second filtrate was 53.3 g. of hygroscopic, brittle, off-white foam. The stoichiometry of the reaction showed an average loss of two moles of methanol in each mole of condensate. That the product was largely the monocyclic betaine

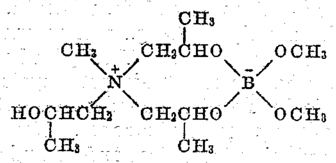

rather than less stable linear condensates was shown by the following experiment:

A 28.0 g. quantity of product, containing 1.7 g. sodium chloride, was dissolved in 200 ml. refluxing methanol and then very slowly distilled at a reflux ratio which permitted collection of 100 ml. of distillate in 10½ hours. Only a trace of trimethylborate distilled over as its azeotrope with methanol; the rest of the distillate was methanol. Evaporation of the remaining liquid in the pot at 90–100° C. in vacuo gave further condensation to yield 24.1 g. of brittle, colorless, foam. This was converted to a high polymer in Example XLI.

EXAMPLE XXXIV

A solution of 87.7 g. 1,2-bis-(2-hydroxypropyl)amino ethane in 200 ml. of methanol was treated with 93.7 g. of methyl iodide, and allowed to stand overnight. An additional 50 ml. of methanol was added, and the mixture was refluxed for four hours under a Dry Ice-cooled condenser. Devolatilization gave a light yellow, viscous syrup which, after thorough extraction with acetone and vacuum drying, gave as a pale orange viscous syrup, 138.1 g. (80% of the theoretical yield) of 1,2-ethylene-bis[methyl-bis-(2-hydroxypropyl)ammonium iodide], containing about 10% of the monomethiodide.

EXAMPLE XXXV

The ethylene diquaternary salt of Example XXXIV, 31.2 g. in 50 ml. of methanol, was treated with a solution of 17.1 g. sodium tetramethoxyborate in 50 ml. of methanol, and allowed to stand overnight. The clarified solution was evaporated dry to give a quantitative yield of brittle white foam, melting largely at 76° C., very largely the uncondensed salt and an equivalent amount of sodium iodide. Nevertheless the sodium iodide simultaneously formed could not be identified as such by X-ray diffraction studies, nor could it be separated from the organic salt by extraction or recrystallization. The product is converted to a polymer in Example XXXVIII.

EXAMPLE XXXVI

The dimethiodide of Example XXXIV, 121.2 g., was converted by essentially the procedure of Example IV to the dimethochloride.

EXAMPLE XXXVII

The ethylene dimethochloride of Example XXXVI (containing about half its weight of monomethochloride), 19.3 g. in 50 ml. methanol, was treated with 12.9 g. sodium tetramethoxyborate as in Example XXXV. Refiltration after dilution with benzene gave a total of 2.4 g. (50%) sodium chloride. Evaporation of the filtrate gave as a brittle foam 25.9 g. of a mixture of products averaging 2–3 moles of methanol lost in condensation. The product mixture sintered at 65° C., and melted at 175–

178° C. The polymerization of this mixture is described in Example XXXIX.

EXAMPLE XXXVIII

A 5 g. sample of the salt formed in Example XXXV was heated in vacuo (under a blanket of nitrogen) at 120° C. for three hours. Although the salt showed a melting point of 76° C. in a sealed tube, the 5 g. sample did not melt. This was undoubtedly due to the formation of higher melting condensates, since a test portion of the heated product was shown to melt at 140–150° C. with some discoloration. The final product, weighing 3.8 g., corresponded to a loss of more than 6 moles of methanol.

EXAMPLE XXXIX

A 10–20 g. quantity of the mixed products from Example XXXVII was dried to constant weight at room temperature and 3 mm. of mercury, giving 9.96 g. of dry condensate. This loss of weight represented very largely the water picked up by the product in handling. At 3 mm., the product was heated to 100° C. in one hour, and held there one hour; volatile products being stripped off under vacuum as formed. Approximately 10% of the weight of the product, 0.93 g., was so lost. The product was then heated up to its liquifaction temperature, 220–230° C., and held there for one hour; during this period 2.95 g. of product was lost in volatilization. A very small amount of high-boiling liquid had condensed on the upper part of the reactor; this portion being readily soluble in acetone and free of borate. The major part of the heat-treated solid was a tan residue, weight 6.08 g. The solid was a largely polymeric condensate presumably containing

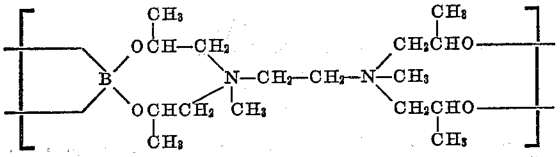

units, as well as cross-links, since it was dispersible, rather than soluble in water. Trituration with acetone removed much of the color, leaving a light tan polymeric solid melting with decomposition at about 210° C.

EXAMPLE XL

A procedure similar to that of Example XXXIX was followed using 7.86 g. fraction 32–6 from Example XXXII. Because of its earlier heat treatment, this condensate mixture was less hygroscopic and less capable of further condensation than the starting material used in Example XXXIX. At room temperature it lost only 0.01 g. At 100° C. it lost about 10% of its weight (i.e. 0.70 g.) without an appreciable change in melting point (65–75° C.). However, during exposure at the higher temperature, it lost only 0.47 g. The final product, weighing 6.68 g. (93.4% of the starting weight), was a dark, very viscous oil which showed very little flow. It was dispersible in water with an alkaline reaction; acidification caused no precipitate. It was dispersible in acetone, which suggests that the major part of the mixture was polymer containing the unit

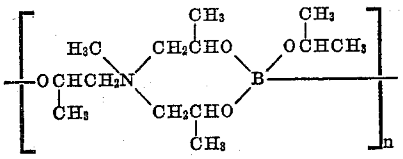

EXAMPLE XLI

A quantity of the product of Example XXXIII initially melting at 73–87° C., was dried down in vacuo at room temperature to 9.58 g. After a 100° C. heat treatment, the product weighed 8.63 g. (a 9.7% weight loss) and melted at 170–80° C. After being held at 200° C., the sample had lost a total of 3.53 g. in weight (36.8%) and consisted of a stringy, light tan gum, containing suspended sodium chloride. It was only partially water soluble, but quite soluble in alcohol, less so in acetone. The properties suggest that the initial condensate was converted to a not very highly cross-linked polymer.

EXAMPLE XLII

To a magnetically stirred flask equipped with thermometer and a reflux condenser was charged 100 ml. of dry, peroxide-free tetrahydrofuran, then 2.24 g. of sodium tetrahydroborate. The stirred suspension was chilled to and held at approximately −80° C. while small portions of tetrakis(hydroxymethyl)phosphoniumchloride (totalling 11.2 g.) were washed down the condenser into the flask with a total of 50 ml. more of solvent. The slurry (protected from moisture) was stirred ½ hour more at approximately −70° C. and then stirred while it was allowed to come to room temperature (3 hours). It was finally warmed to 65° C. At slightly below room temperature the desired metathesis became apparent:

$$(HOCH_2)PCl+NaBH_4 \rightarrow [(HOCH_2)_4P][BH_4]+NaCl$$

The crude reaction product was a very hygroscopic mixture of salts which was more reactive than either of the starting components. It was partially to completely soluble in water, alcohols, acetone, and dimethylformamide, in each case with marked gas evolution. Unlike the starting sodium tetrahydroborate, it was insoluble in the dimethyl ethers of diethylene and triethylene glycols.

The dry tetrakis-(hydroxymethyl)phosphonium tetrahydroborate, on being gently warmed as a thin layer on the bottom of a beaker, evolved highly inflammable gases (principally hydrogen) at about 90° C. to 220° C. It changed first into a liquid and finally into a solid. The final polymer was a mixture of products, similar to that of Example VI but containing small amounts of active hydrogen.

EXAMPLE XLIII

Two sets of five No. 4 finishing nails were degreased in n-butyl ether, dried, weighed and placed in small suction filtration flasks. In one case, the five nails weighed 4.0581 g.; in the other the weight was 4.0485 g. A solution was prepared by dissolving in 53 ml. deionized water 0.53 g. of the polymeric mixture obtained on holding the product of Example XIV at elevated temperatures. This solution (pH 10.55) was added to the nails in Flask 43A. A control solution of sodium carbonate in deionized water, 53 ml. at pH 10.5, was added to the nails in Flask 43B. Air at room temperature was bubbled through both solutions at the same rate for 24 hours. At the end of 30 minutes, the nails in the control Flask 43B had begun to rust. At the end of 24 hours, the control flask, 43B, was opaque with rust, while its nails were pitted and rusty. Flask 43A was no more turbid than when first charged; the solution therein was free of rust, and the nails were as clean and free of pitting as they were 24 hours earlier. The control nails, when carefully washed and dried, had lost 0.0162 g., or 3.99% of their initial weight. The nails protected by our novel polymer had lost only 0.0009 g., or 0.02% (within experimental error of no loss).

EXAMPLE XLIV

To demonstrate the effectiveness of our novel surfactant betaines in emulsion polymerization action, the following experiment was conducted: An emulsion of 65 parts of styrene, 35 parts alpha-methylstyrene, and commercial methyl ethyl ketone peroxide (0.8 part) was made in 180 ml. of water using 1.5 parts by weight of the product of Example XVII. The stable emulsion was polymerized for 8 hours at 115° C., steamstripped of volatiles at 100° C., and then coagulated by the accepted salt-acid procedure. There was thus obtained a 75.1% yield of latex, singularly free of coagulum, having a heat distortion temperature of 196° F. There are relatively few polymerization emulsificants commercially available which produce copolymers of these two monomers in such high yields, without coagulum formation.

EXAMPLE XLV

In a preliminary screening test for contact insecticides, different amounts of the product of Example XXII were ground to a uniform powder with 25 parts of diatomaceous earth ("Micro-Cel 800"), 2 parts dispersant ("Naccanol SW") and 73 parts pyrophyllite ("Pyrax"). The wettable powders so obtained were suspended in the desired amount of water, and cranberry bean plants were dipped into the different suspensions and allowed to dry. Third instar larvae of the Mexican Bean Beetle were then caged on the treated plants and maintained under greenhouse conditions for 48 hours. After that time, observations were made of mortality, plant injury, and percent feeding. On the basis of three replicates, each using fifteen organisms at concentration levels of 10, 100 and 1000 p.p.m. of toxic condensate, it was established that the $LD_{50}$ for the product of Example XXII was 80 p.p.m. No plant injury resulted, even at the 1000 p.p.m. level. Thus, the products of the invention are effective insecticides.

We have thus provided a new type of ionic condensate which, because of the linking of balanced, oppositely charged atoms in the molecule, is virtually incapable of dissociation. Since the novel reaction by which these condensates are made can be conducted under conditions to provide both inter- and intramolecular condensation, it is possible to obtain unimers and polymers as products.

All of the products of the invention have remarkable antistatic properties. Since they are, for the most part, water-soluble, they can be applied in dilute aqueous solutions, e.g. of 2–5% strength, for use as textile finishing agents. When used as such they are very effective in making dusting cloths for phonograph records. While the antistatic properties of our novel products are inherent in the structure, variations in the R and R′ of our general formula permit of a wide range of applicability. Thus the products of Examples XV, XVIII and especially XXV are not only surfactants and therefore softeners, they are also textile antistatics. Polymers such as might be derived from Example XIV can be applied to metals or glass as antistatic agents.

The unimeric products of the invention can be used as intermediates in producing the useful charged polymers if they contain substituents which are capable of further condensation. Furthermore, they are in themselves useful for a variety of practical applications. The compounds of the invention wherein the R group attached to the Q atom is a fatty, aliphatic chain of sufficient length (e.g. at least 8 carbon atoms) to counterbalance the hydrophilic nature of the betaine moiety are novel germicides, fungicides and surface active agents. These compounds are also excellent emulsificants in the emulsion polymerization of styrene. All of the unimeric products of the invention are effective acid and alkali scavengers. They are useful, therefore, in chemical reactions where a buffering agent is required.

The novel polymers and polymeric mixtures of the invention (or mixtures of polymers and unimers) are useful as protective coatings for pipe, metal fittings, and the like, as is shown in Example XLIII. The mixtures of the materials, the composition of which can be controlled either by varying the reaction conditions or by blending the products of the invention, are especially useful, since they provide for flexibility in the particular physical properties of the ultimate product. Since the polymers of the invention are water-soluble, they are easily applied to a given metal substrate from aqueous solution by spraying, dip coating or flow coating. The three dimensional nature of the polymers tends to give them relatively good heat stability as compared with, for example, polystyrene.

We claim:

1. Compounds of the formula:

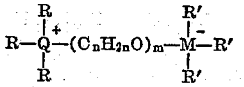

wherein Q is a member selected from the group consisting of quaternized nitrogen and phosphorus atoms; M is a member selected from the group consisting of tetracovalent negatively charged boron and aluminium atoms; *n* is an integer having a value of 1–6; *m* is an integer having a value of 1–25; R is a member selected from the group consisting of acyclic hydrocarbon radicals having up to 20 carbon atoms, benzyl, amino lower alkyl, alkylacylamino lower alkyl, $$—(C_nH_{2n}O)_mH,\quad —(C_nH_{2n}O)_mM^-(R')_3$$

and $$[—(C_nH_{2n}O)_mM(R')_3]^-Y^+$$

wherein Y is a cation selected from the group consisting of the metals of groups 1A and 2A of the periodic table; R′ is a member selected from the group consisting of hydrogen, lower alkoxy, $—(C_nH_{2n}O)_mQ^+R_3$ and $[—(C_nH_{2n}O)_mQR_3]^+X^-$, wherein X is an anion of a strong acid; and R and R′ when taken collectively with the Q and M on which they are respective substituents form a heterocycle of the group consisting of

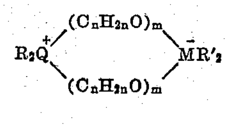

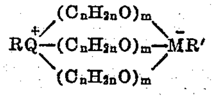

and

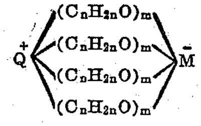

2. Compounds according to claim 1 wherein Q is N, M is B, two of the R substituents are acyclic hydrocarbon radicals having up to 20 carbon atoms, two of the R′ substituents are lower alkoxy, and the remaining R substituent and R′ substituent complete the heterocycle

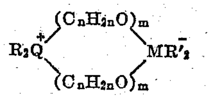

3. Compounds according to claim 1 wherein Q is N, M is B, two of the R substituents are $—(C_nH_{2n}O)_mH$, two of the R′ substituents are $—(C_nH_{2n}O)_mQR_3$, and the remaining R substituent and R′ substituent complete the heterocycle

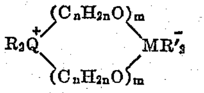

4. Compounds according to claim 1 wherein Q is N, M is Al, one R substituent is hydroxy lower alkyl, one R substituent is benzyl, the remaining R substituent is an acyclic hydrocarbon radical having up to 20 carbon atoms, and the three R′ substituents are lower alkoxy.

5. Compounds according to claim 1 wherein Q is N, M is B, the three R substituents are $—(C_nH_{2n}O)_mH$, two R′ substituents are lower alkoxy, and the remaining R′ substituent is hydrogen.

6. Compounds according to claim 1 wherein Q is P, M is B, one R substituent is $—(C_nH_{2n}O)_mQR_3$, one R′ is alkoxy, and the two remaining R substituents and the two remaining R′ substituents are taken collectively to form the heterocycle

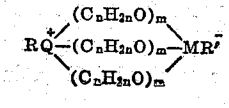

7. 2,2 - dimethoxy - 6-methyl-6-octadecyl-1,3-dioxa-2-bora-6-azacyclooctane betaine.

8. Polymerized 2,2 - dimethoxy - 6,6-bis-(2-hydroxy-ethyl)-2-bora-6-aza-1,3-dioxacyclooctane betaine.

9. 2 - [benzyl"coco"β-hydroxyethyl-ammonio] - ethoxy-tri-2-propoxyaluminate betaine.

10. 2 - [tris-(2-hydroxyethyl)ammonio]-ethoxydimethoxyhydroborate betaine.

11. Polymerized 1 - hydroxymethyl-4-methoxy-1-phospha-4-bora-3,5,8-trioxabicyclo[2.2.2.]octane betaine.

12. Method of making condensed metal ester betaines comprising reacting in an inert organic liquid medium a compound of the formula:

$$\left[\begin{array}{c} R \\ | \\ R-Q-(C_nH_{2n}O)_mH \\ | \\ R \end{array}\right]^+ X^-$$

wherein Q is a member selected from the group consisting of quaternized nitrogen and phosphorus atoms; R is a member selected from the group consisting of acyclic hydrocarbon radicals having up to 20 carbon atoms, benzyl, amino lower alkyl, alkylacylamino lower alkyl, and —$(C_nH_{2n}O)_mH$; $n$ is an integer having a value of 1–6; $m$ is an integer having a value of 1–25; and $X^-$ is an anion of a strong acid; with a compound of the formula:

$$Y^+\left[\begin{array}{c} R' \\ | \\ R'-M-R' \\ | \\ R' \end{array}\right]^-$$

wherein M is a member selected from the group consisting of tetracovalent negatively charged boron and aluminum atoms; R′ is a member selected from the group consisting of hydrogen and lower alkoxy; and Y is a cation selected from the group consisting of the metals of groups 1A and 2A of the periodic table.

13. Method according to claim 12 wherein the reaction is conducted at a temperature between about −180 and 250° C.

14. Method according to claim 12 wherein the reaction is conducted under sub-atmospheric pressure at a temperature between about 125 and 250° C. and polymeric products are obtained.

15. Method according to claim 12 wherein the reaction is conducted at a temperature between about 0 and 60° C. and unimeric products are obtained.

No references cited.

UNITED STATES PATENT OFFICE
Certificate of Correction

Patent No. 2,976,307 March 21, 1961

Bernard Rudner et al.

It is hereby certified that error appears in the above numbered patent requiring correction and that the said Letters Patent should read as corrected below.

Column 1, lines 62 to 65, the left-hand portion of the formula should appear as shown below instead of as in the patent:

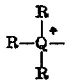

columns 5 and 6, TABLE A, structure number 7 should appear as shown below instead of as in the patent:

$$[n\text{-}C_{16}H_{33}P(CH_2CHOHCH_2CH_3)_3]^+Br^-$$

column 9, lines 36 and 37, the extreme left-hand portion of the formula should appear as shown below instead of as in the patent:

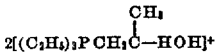

same column 9, line 75, for "weigh" read —weight—; column 10, line 27, for "stoichiomertic" read —stoichiometric—; line 34, the formula should appear as shown below instead of as in the patent:

$$[(CH_3)_3PCH_2CH_2OH]^+$$

same column 10, line 39, for "stoichiomertic" read —stoichiometric—; column 12, line 9, the formula should appear as shown below instead of as in the patent:

$$AgI+[CH_3N(C_2H_4OH)_3]^+Cl^-$$

column 13, line 46, for "-2,2-dimethoxyl,3-" read — -2,2-dimethoxy-1,3- —; column 15, line 65, for "formed" read —foamed—; columns 21 and 22, line 45, the extreme left-hand portion of the formula should appear as shown below instead of as in the patent:

$$NaBH(OCH_3)_3$$

column 24, line 28, for "Dry Ice-cooled" read —dry ice-cooled—; column 25, line 39, after the closing bracket of the formula insert a sub "x"; line 47, for "fraction" read —Fraction—; column 26, line 22, for that portion of the formula reading $$[BH_4]+NaCl \quad \text{read} \quad {}^+[BH_4]^-+NaCl$$

column 28, line 10, for "aluminium" read —aluminum—; line 23, for that portion of the formula reading "$Q+R_3$" read —$QR_3$—; column 29, lines 7 and 8, for "-ethoxydimethoxhydroborate" read — -ethoxydimethoxyhydroborate —.

Signed and sealed this 12th day of September 1961.

[SEAL]

Attest:

ERNEST W. SWIDER, DAVID L. LADD,

*Attesting Officer.* *Commissioner of Patents.*